United States Patent
Chang

(10) Patent No.: US 9,688,241 B2
(45) Date of Patent: Jun. 27, 2017

(54) PRETENSIONER OF SEAT BELT FOR VEHICLE

(71) Applicant: Hyundai Motor Company, Seoul (KR)

(72) Inventor: Sung Hun Chang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 257 days.

(21) Appl. No.: 13/931,490

(22) Filed: Jun. 28, 2013

(65) Prior Publication Data

US 2014/0077018 A1  Mar. 20, 2014

(30) Foreign Application Priority Data

Sep. 20, 2012  (KR) .................. 10-2012-0104681

(51) Int. Cl.
*B60R 22/46* (2006.01)

(52) U.S. Cl.
CPC ...... *B60R 22/4628* (2013.01); *B60R 22/4619* (2013.01); *B60R 2022/4638* (2013.01); *B60R 2022/4642* (2013.01)

(58) Field of Classification Search
USPC .......... 242/374; 280/805–807; 297/475–480; 60/635
See application file for complete search history.

(56) References Cited

U.S. PATENT DOCUMENTS

| | | | |
|---|---|---|---|
| 5,690,295 A | 11/1997 | Steinberg et al. | |
| 5,881,962 A | 3/1999 | Schmidt et al. | |
| 6,345,504 B1 | 2/2002 | Takehara et al. | |
| 6,363,722 B1 | 4/2002 | Takehara et al. | |
| 6,485,058 B1 * | 11/2002 | Kohlndorfer et al. | 280/808 |
| 8,573,648 B2 * | 11/2013 | Park | B60R 22/03 242/374 |
| 2007/0278338 A1 * | 12/2007 | Saito et al. | 242/374 |
| 2008/0303262 A1 * | 12/2008 | Sakakida | B60N 2/4808 280/806 |
| 2010/0276531 A1 * | 11/2010 | Shiotani et al. | 242/374 |

FOREIGN PATENT DOCUMENTS

| | | |
|---|---|---|
| JP | 2002-2448 A | 1/2002 |
| KR | 10-0384034 B1 | 5/2003 |
| KR | 10-0590193 B1 | 6/2006 |
| KR | 10-0620620 B1 | 9/2006 |
| KR | 10-0885413 B1 | 2/2009 |

* cited by examiner

*Primary Examiner* — Sang Kim
(74) *Attorney, Agent, or Firm* — Morgan Lewis & Bockius LLP

(57) ABSTRACT

A pretensioner apparatus of a seat belt may include a movement tube, a piston movably disposed inside the movement tube, a gas generator fluid-connected to the movement tube and generating a gas upon crash of the vehicle so as to inject the gas into the movement tube to move the piston in a predetermined direction, a linkage unit, a worm connected to the piston through the linkage unit, and a worm wheel engaged with the worm, wherein the worm rotates according to movement of the piston via the linkage unit when the piston moves in the predetermined direction by the gas generated by the gas generator, and wherein the worm wheel fixed to a spool rotates together with the worm to rotate the spool and a seat belt webbing connected to the spool is wound around the spool while the worm rotates according to the movement of the piston.

7 Claims, 6 Drawing Sheets

[NORMAL ROTATION OF SPOOL UPON ACTUATION OF PRETENSIONER]

PRETENSIONER OF SEAT BELT FOR VEHICLE

CROSS-REFERENCE TO RELATED APPLICATION

The present application claims priority to Korean Patent Application No. 10-2012-0104681 filed Sep. 20, 2012, the entire contents of which is incorporated herein for all purposes by this reference.

BACKGROUND OF THE INVENTION

Field of the Invention

The present invention relates to a pretensioner of a seat belt for a vehicle. More particularly, it relates to a pretensioner of a seat belt for a vehicle, which can prevent locking-dip and overshoot and achieve reduction of performance deviation, improvement of operational reliability, and improvement of passenger protection performance as a restraint apparatus.

Description of Related Art

Generally, seat belts can secure passengers upon crash of vehicles and prevent passengers from being thrown forward to minimize their injuries. When there is a crash while passengers are wearing seat belts, the forward movement of passengers should be prevented by the seat belts. However, since seat belts are unwound to a certain degree until seat belts (webbing) are locked by a retractor due to an impact generated at the crash moment, passengers may not be appropriately protected.

Passengers are thrown forward by a great external force during the crash. Even though passengers are secured by seat belts, a certain portion of seat belt is unwound due to an elongation of a webbing and a time delay of a retractor lock, allowing the upper body of a passenger to move forward.

Accordingly, a pretensioner is being used to reduce the injury of passengers by instantaneously rewinding the seat belt (webbing) thus early restraining the movement of passengers upon crash of vehicles. When the seat belt (webbing) is instantaneously rewound, the tension of the seat belt increases, thereby minimizing the forward movement of a passenger and reducing the injury of a passenger.

Mechanisms for rewinding the webbing to instantaneously operate the pretensioner are typically divided into a rack & pinion type and a gear rotation type using a steel-ball.

FIG. 3 is a view illustrating a typical steel-ball type pretensioner. As shown in FIG. 3, steel-balls 3 are pushed by a piston 2 formed of silicon due to a gaseous pressure generated by explosion of a Micro Gas Generator (MGG) 1, and are engaged with a gear 4 to allow the gear 4 and a spool to be instantaneously rotated and thus a webbing to be wound (normal rotation)

However, in this steel-ball type pretensioner, since a tube 6 that is a gas passage is advantageous in package space because it is configured to be bent, a performance deviation may occur due to a clearance between steel-balls, a ball jam in the gear due to the clearance, a deformation and jam of the piston, an energy loss in transmission of an explosive power of the MGG 1, and residual gas pressure/friction.

For the actuation of a load limiter after the rewinding of the pretensioner (i.e., for torsion of a torsion bar), a separate locking unit is needed to restrain the rotation of the spool (rotation of the spool is restrained after slight reverse rotation)

In this case, when a rotation element in the pretensioner is not locked, the spool counter rotates, and thus the webbing is unwound.

When the reverse rotation (until the rotation of the spool is restrained) of the spool occurs by the operation of the pretensioner, a residual gas cannot escape. In this case, as shown in FIG. 4, since a resistance (residual pressure) of a residual gas occurs, the initial load of the belt may significantly increase in a moment (overshoot). When a vent hole is processed to prevent the overshot, the initial restraint force may be reduced.

Also, as shown in FIG. 5, when the spool counter rotates, the silicon piston 2 is deformed to be jammed between the ball 3 and the tube 6, causing occurrence of a resistance and increasing the initial load.

In addition, since all balls 3 are not integrally combined, as shown in FIG. 6, the balls 3 may be jammed in the gear 4 or a dislocation (phase difference) between the ball 3 and the gear 4 may occur, causing an overshoot in which the initial belt load increases.

FIG. 7 is a view illustrating a typical limitation, which shows a load applied to the seat belt by the pretensioner upon crash, and shows that an overshoot in which the initial belt load increases occurs in a typical pretensioner.

Due to the overshoot, a certain performance is difficult to achieve, and a performance deviation occurs. Thus, there is a difficulty in tuning of the specifications of the restraint apparatus and the injury of passengers may become severe upon crash.

FIG. 8 is a view illustrating a typical rack & pinion type pretensioner. In the rack & pinion type pretensioner, the linear motion of a piston 8 and a rack 9 causes a pinion 10 to rotate due to a gas pressure generated by the explosion of a MGG 7. When a spool receives a rotary force of the pinion 10 and rotates, a webbing is instantaneously wound around the spool.

However, although force transmission by the explosion of the MGG 7 is advantageous, the size of the rack & pinion type pretensioner is great and the rack 9 that linearly moves occupies much space. Accordingly, the rack & pinion type pretensioner has a limitation in that the package space increases and thus its weight and cost increases.

Also, in both steel-ball type and rack & pinion type, although a residual gaseous pressure or a separate locking unit (locking a rotation element in the pretensioner) is used to operate a load limiter, particularly, to fix the spool after the operation of the pretensioner (after rewinding of the seat belt webbing), these cause a variation in action and performance, and make it difficult to control and make it complicated to configure the apparatus.

Also, as shown in FIG. 7, locking-dip that is an instantaneous reduction of the belt load after the operation of the pretensioner may occur in the spool fixing type that uses a residual gaseous pressure.

The locking-dip is a phenomenon in which the load increases due to the gaseous pressure inside the tube after the operation of the pretensioner, and then the gaseous pressure decreases before an Emergency Locking Retractor (ELR) for fixing the seat belt webbing is locked and the load again increases after the ELR lock. It is known that the locking-dip occurs in most typical pretensioners to a greater or lesser extent.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pretensioner of a seat belt for a vehicle, which can prevent locking-dip and overshoot and achieve reduction of performance deviation, improvement of operational reliability, and improvement of passenger protection performance as a restraint apparatus.

The present invention also provides a pretensioner of a seat belt for a vehicle, which can improve a limitation in a package space while facilitating performance tuning.

In an aspect of the present invention, a pretensioner apparatus of a seat belt for a vehicle, may include a movement tube, a piston movably disposed inside the movement tube, a gas generator fluid-connected to the movement tube and generating a gas upon crash of the vehicle so as to inject the gas into the movement tube to move the piston in a predetermined direction, a linkage unit, a worm connected to the piston through the linkage unit, and a worm wheel engaged with the worm, wherein the worm rotates according to movement of the piston via the linkage unit when the piston moves in the predetermined direction by the gas generated by the gas generator, and wherein the worm wheel fixed to a spool rotates together with the worm to rotate the spool and a seat belt webbing connected to the spool is wound around the spool while the worm rotates according to the movement of the piston.

The linkage unit may include a wire having an end connected to the piston, and the other end connected to a winding part formed on an end of the worm, wherein the other end of the wire is kept wound around the winding part when the crash of the vehicle does not occur, and wherein the other end of the wire rotates the worm while being unwound from the winding part upon the movement of the piston in the predetermined direction when the gas is injected into the movement tube.

An end of the movement tube is sealed and the linkage unit slidably passes through the end of the movement tube.

The linkage unit may include a wire having an end connected to the piston through the end of the movement tube, and the other end connected to a winding part formed on an end of the worm, wherein the other end of the wire is kept wound around the winding part when the crash of the vehicle does not occur, wherein the other end of the wire rotates the worm while being unwound from the winding part upon the movement of the piston in the predetermined direction when the gas is injected into the movement tube, and wherein the gas generator is connected to a portion of the movement tube between the end of the movement tube and the piston.

The piston is shaped of a ball.

A torsion bar is connected to the spool.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
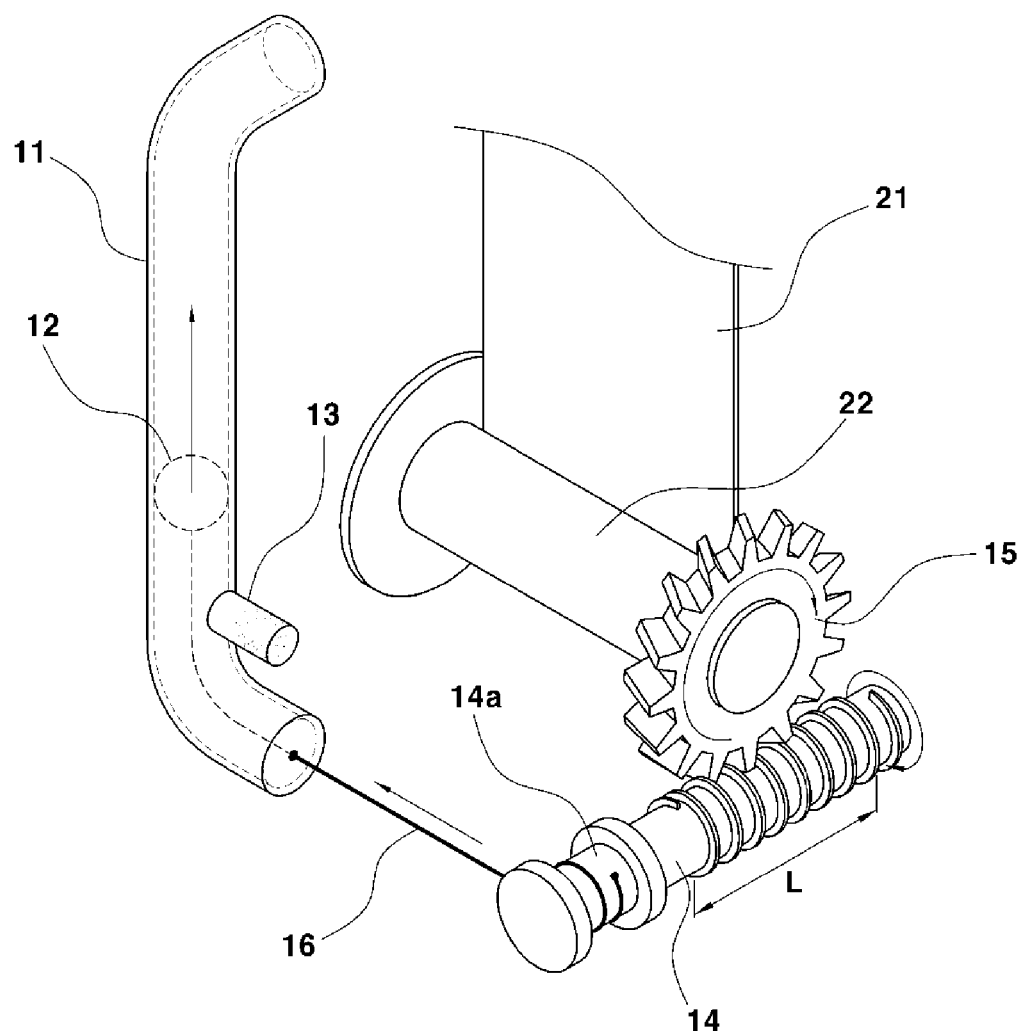
FIG. 1 is a view illustrating a worm drive type of pretensioner according to an exemplary embodiment of the present invention.

Reference numerals set forth in the Drawings includes reference to the following elements as further discussed below, It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

FIG. 1 is a view illustrating a worm drive type of pretensioner according to an exemplary embodiment of the present invention, which shows a configuration capable of instantaneously winding a seat belt webbing in concurrence with explosion of a Micro Gas Generator (MGG) upon crash of vehicles.

Figure 2:
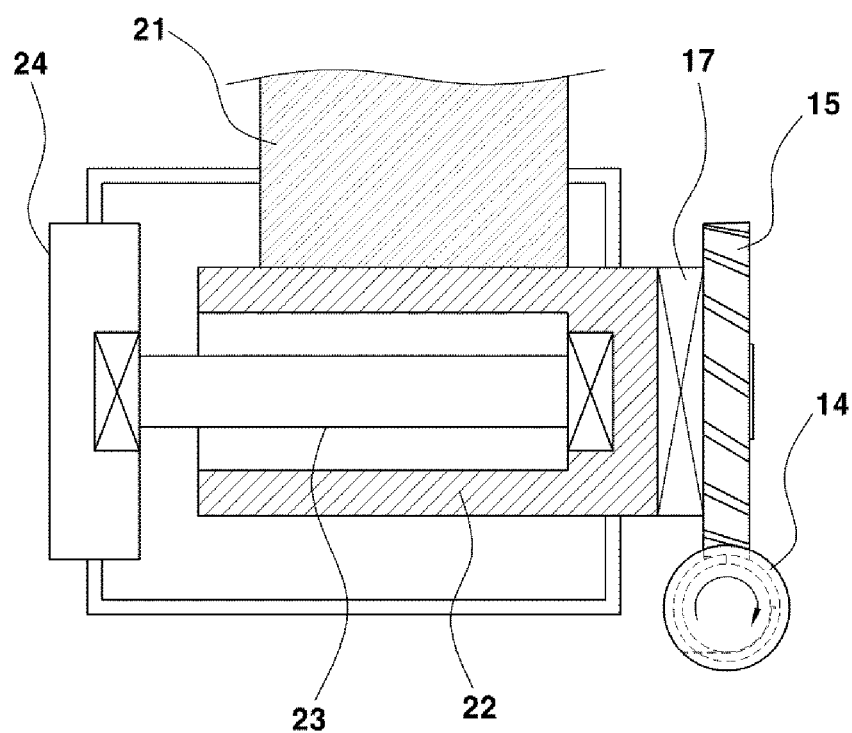
FIG. 2 is a schematic view illustrating a connection relation among a worm drive type of pretensioner, a spool, a torsion bar, and a retractor according to an exemplary embodiment of the present invention.
Figure 3:
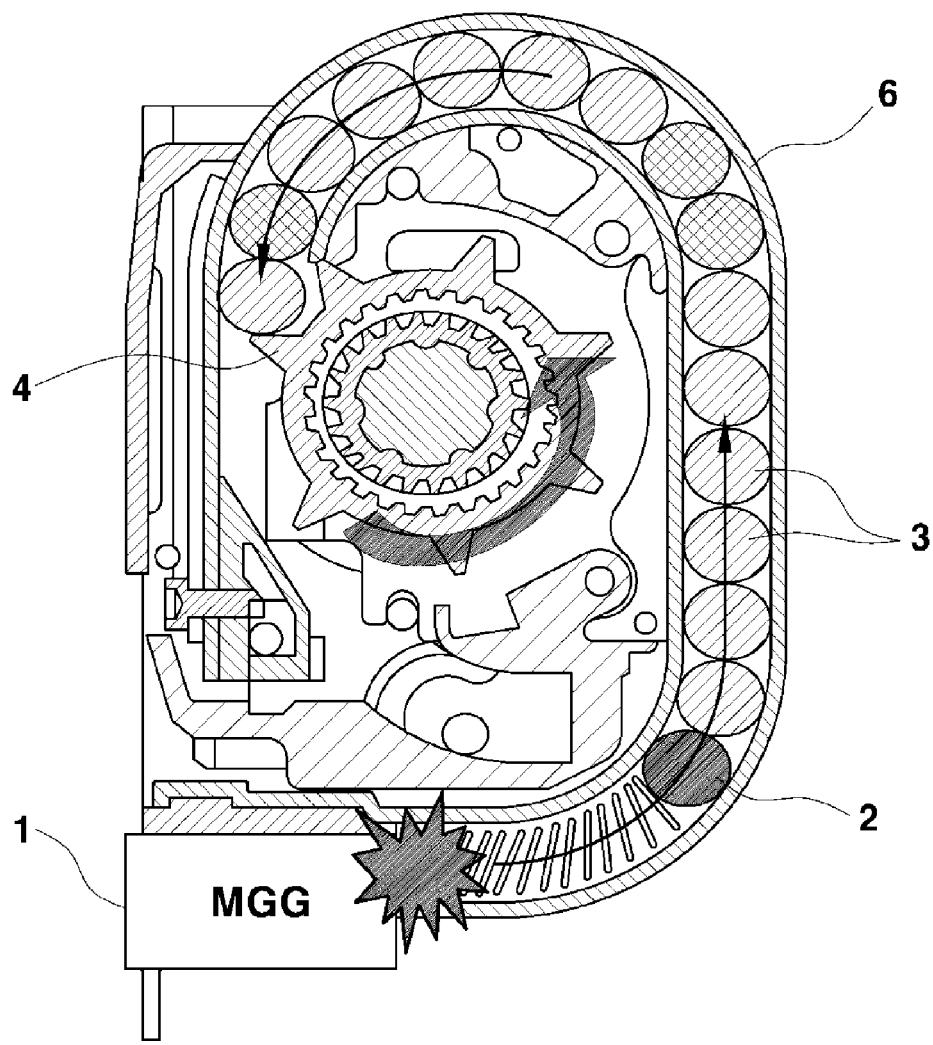
FIG. 3 is a view illustrating a typical ball-type of pretensioner in a related-art.
Figure 4:
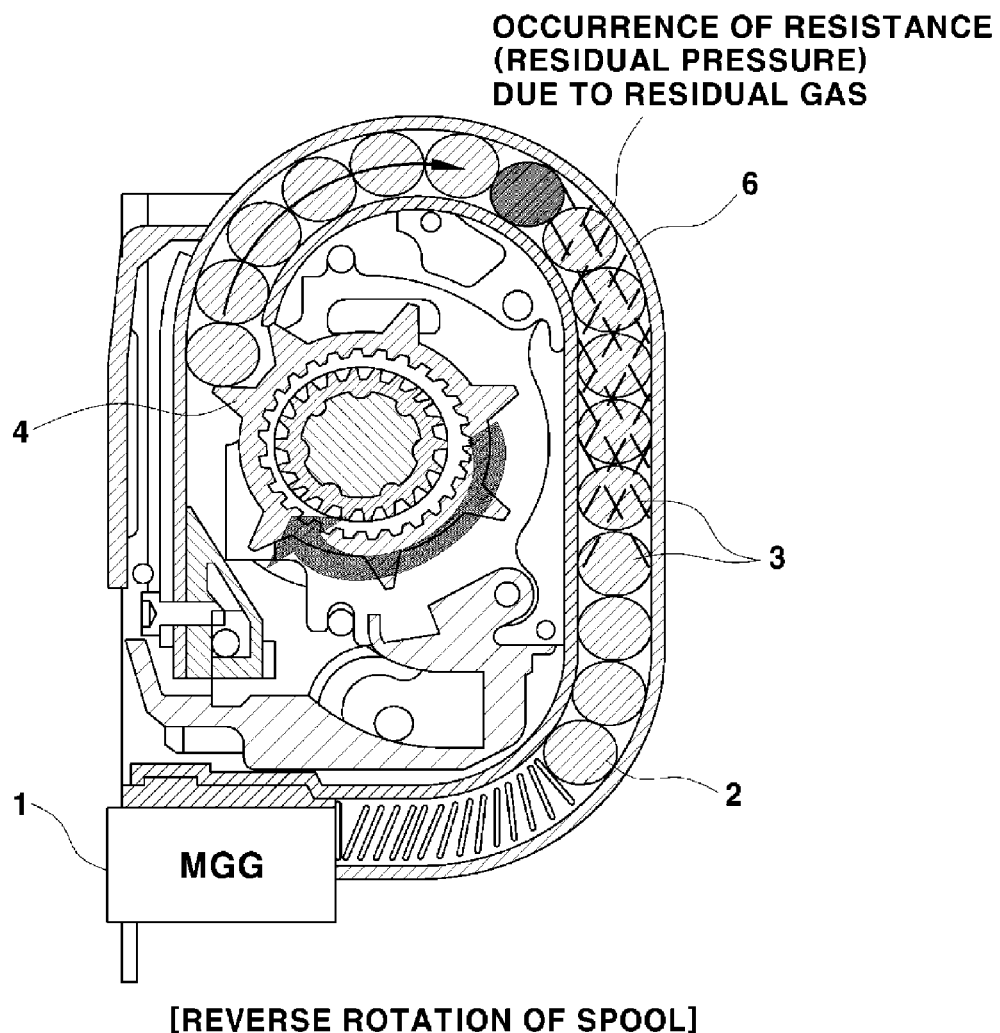
FIGS. 4 through 7 are views illustrating typical limitations in a related-art.
Figure 5:
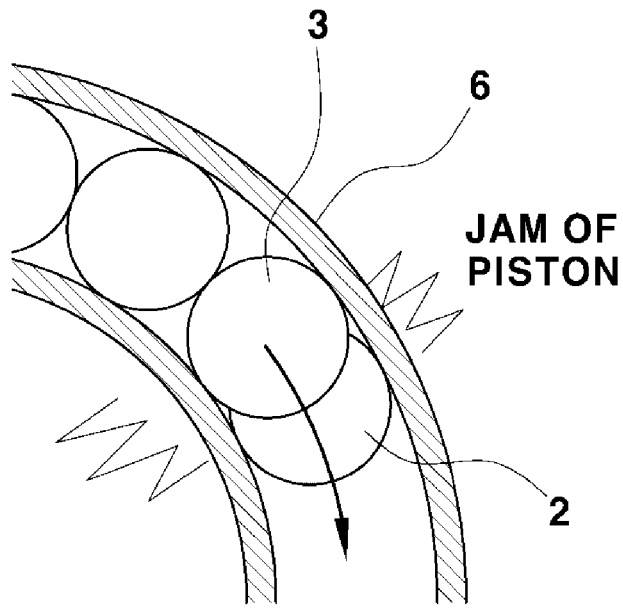
Figure 6:
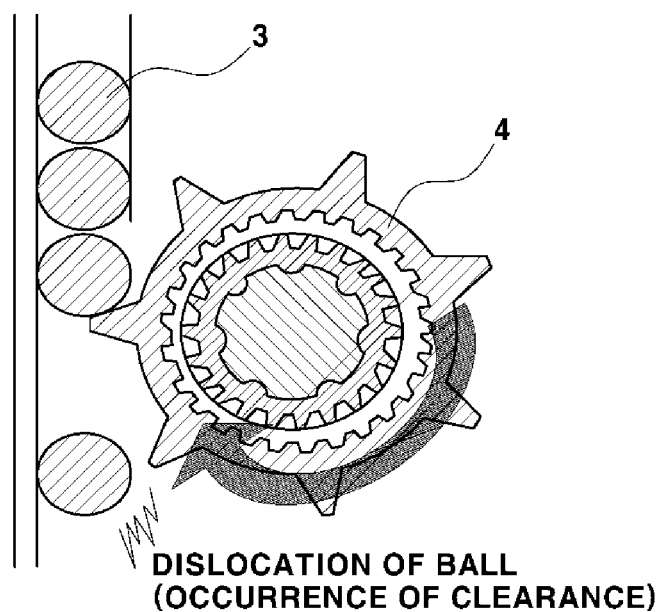
Figure 7:
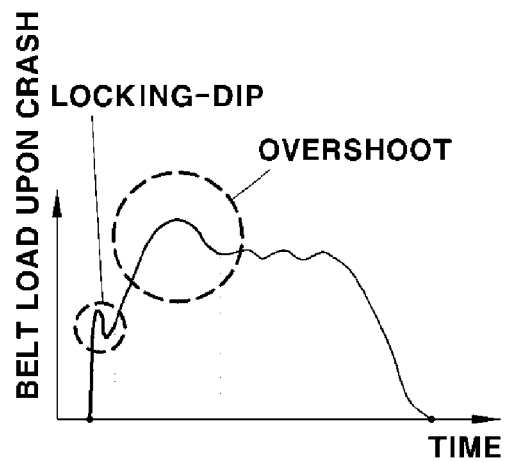
Figure 8:
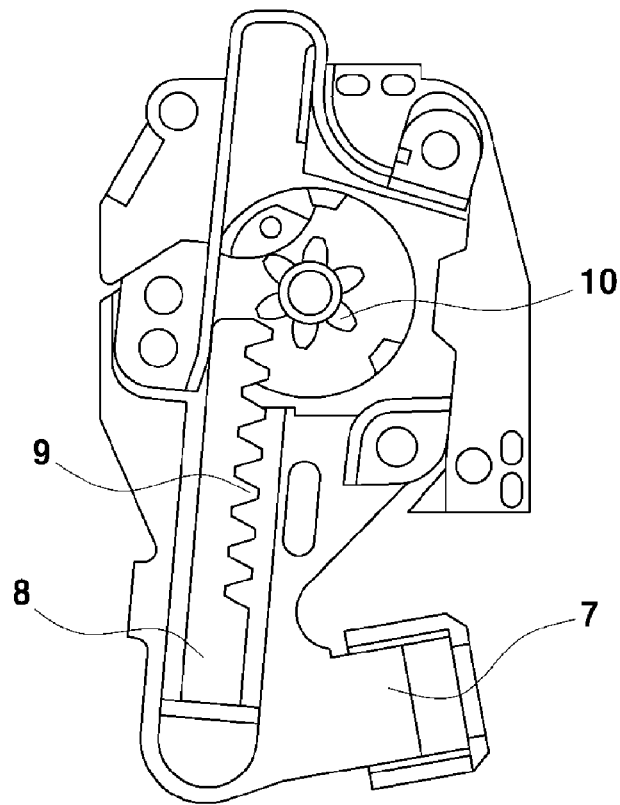
FIG. 8 is a view illustrating a typical rack & pinion type of pretensioner in a related-art.

FIG. 2 is a schematic view illustrating a connection relation among a worm drive type of pretensioner, a spool, a torsion bar, and a retractor.

Referring to FIG. 1, the pretensioner may include a movement tube 11, a piston 12, an MGG 13, a worm 14, and a worm wheel 15. The piston 12 may be movably disposed along the movement tube 11. The MGG 13 may generate gas upon crash of a vehicle to inject gas into the movement tube 11, and may be disposed to act on the front side of the piston 12 such that a gaseous pressure moves the piston 12 in the backward direction. The worm 14 may rotate in linkage with the backward motion of the piston 12 by a linkage unit. The worm wheel 15 may engage with the worm 14, and may rotate in linkage with the rotation of the worm 14 to rotate a spool 22 such that a seat belt webbing 21 is wound.

Here, the linkage unit may include a wire 16 that connects between the piston 12 and the worm 14. The wire 16 may have one end connected to the front side of the piston 12 and the other end wound around a winding part 14a integrally formed at one end of the worm 14.

The movement tube 11 may be serve to guide the movement of the piston 12 disposed therein, and may extend to a location adjacent to the worm 14.

In this case, the movement tube 11 may be sealed to prevent gas from leaking out. As shown in FIG. 1, the front end of the movement tube 11 located around the worm 14 may be sealed to prevent the leakage of gas while passing the wire 16 connected to the winding part 14a of the worm 14.

The MGG 13 may be disposed at one side of the movement tube 11 so as to inject gas into the movement tube 11. The MGG 13 may have a typical configuration in which gas is generated by an explosion caused by an electric signal of a controller sensing a crash of a vehicle using a sensor.

The MGG 13 may be disposed so as to inject gas generated by the explosion to the front side of the piston 12 inside the movement tube 11.

Thus, when gas generated by the MGG 13 is injected into the movement tube 11 at the front side of the piston 12, the gaseous pressure may act on the front surface of the piston 12 to allow the piston 12 to move backward.

The piston 12 may be connected to the worm 14, i.e., the winding part 14a of the worm 14 through the wire 16. When the piston 12 moves backward by the gaseous pressure, the wire 16 may be withdrawn and unwound from the winding part 14a to rotate the worm 14.

The worm 14 may be rotatably disposed on a frame or casing equipped with the spool 22. Although a support unit for rotatably supporting the worm 14 is not shown in FIG. 1, this can be implemented with a support fixture and a bearing disposed in a peripheral component such as the frame or the casing.

Since the support unit can be implemented in various forms by those skilled in the art, the support unit has been omitted in FIG. 1.

Also, the worm wheel 15 may engage with the worm 14, and may be configured so as to rotate the spool 22 upon instantaneous rotation.

Hereinafter, the operational state of the pretensioner configured as above will be described in detail.

When the MGG 13 explodes upon crash of a vehicle, gas generated by the explosion may be injected into the movement tube 11, and then the pressure of gas injected into the movement tube 11 may act on the front side of the piston 12.

Thus, the piston 12 may move backward along the inside of the movement tube 11, allowing the wire 16 to be unwound and withdrawn from the winding part 14a of the worm 14.

When the wire 16 is unwound from the winding part 14a, the worm 14 may rotate together with the winding part 14a and the worm wheel 15 being engaged with the worm 14 may also rotate. Accordingly, the worm wheel 15 may allow the spool 22 to rotate, and the seat belt webbing may be instantaneously wound around the spool 22.

Thereafter, when the gas generation from the MGG 13 is completed and the wire 16 is not withdrawn any more, the worm 14 and the worm wheel 15 stop and maintain the status quo. In this case, since the rotation of the worm wheel 15 engaging with the worm 14 is restrained, the spool 22 may be fixed without rotating (role of the pretensioner is completed).

When the operation of the pretensioner is completed, and the rotation of the spool 22 is restrained, a certain portion of webbing 21 may be unwound by the operation (torsion bar that is not shown counter rotates), and thus a load applied to a passenger by the webbing 21 may be reduced by a certain portion.

After the operation of the pretensioner is completed, there may occur self-locking in which the rotation of the worm wheel 15 is restrained while engaging with the worm 14 and simultaneously the spool 22 is maintained at irrotational state. Thus, the self-locking of the worm drive (worm and worm wheel) may allow a typical separate locking unit or a residual gaseous pressure to be unnecessary, thereby overcoming various limitations occurring when the separate locking unit and the residual gaseous pressure are used.

In the worm drive in which the shafts of the worm and worm wheel engaging with each other are orthogonal to each other, the worm 14 can rotate the worm wheel 15, but the worm wheel 15 cannot rotate the worm 14, which means the worm wheel 15 will not rotate unless the worm 14 is broken (self-locking).

In other words, when the worm 14 is rotated by the movement of the piston 12 and the withdrawal of the wire 16, the worm wheel 15 and the spool 22 may rotate and the webbing 21 may be wound, but the worm wheel 15 will not rotate without the rotation of the worm 14. Accordingly, the worm 14 may be maintained at the current location and the worm wheel 15, and the spool may not rotate even though the gaseous pressure disappears, which is called self-locking.

In the worm drive type of pretensioner, the spool 22 may be fixed at a desired time point by the self-locking regardless of the residual gaseous pressure, and thus typical instantaneous load reduction such as locking-dip can be prevented.

Also, since a phase difference of a ball in a typical ball-type of pretensioner does not exist, an abnormal load increase such as overshoot can be prevented. Accordingly, the pretensioner according to the present exemplary embodiment has various advantages such as reduction of performance deviation and improvement of passenger protection performance as a restraint apparatus.

However, in a typical ball-type or rack & pinion type of pretensioner, since a residual gaseous pressure or a separate mechanism (separate locking unit for fixing a rotation element in the pretensioner) is used to fix the location of the spool after rewinding the webbing, the action and operation thereof may not be uniform, causing an operational deviation and making it difficult to control.

Also, in the pretensioner according to this embodiment, since the rotation direction of the worm 14, the worm wheel 15 and the spool 22 can be adjusted, and the number of revolutions can be adjusted according to the winding direction of the wire 16, the winding amount of the webbing can be adjusted upon operation of the pretensioner (the performance tuning is easy as a restraint apparatus).

The length of the movement tube 11 may vary according to the package space. The movement tube 11 may not be a straight tube but a curved tube in consideration of the package space.

For this purpose, the piston 12 may be in shape of a ball to allow the piston 12 to move through the curved tube without interference.

Regarding the teeth of the worm 14, the rotation speed and force of the worm wheel 15 may be controlled by the pitch and the lead angle of the screw thread (performance deviation and distribution reduction as a restraint apparatus). Since the worm wheel 15 is rotated only by the rotation of the worm 14, forces by other external factors may be interrupted, and thus a malfunction and an abnormal operation such as overshoot and locking-dip may be prevented.

Unlike the rack & pinion type, since the worm 14 performs a rotary motion without a linear motion, and performs the same role regardless of the length L thereof, the worm 14 may not occupy a large space, and thus may be free from the limitation of the package space.

Referring to FIG. 2, the operation of the pretensioner and the load limiter may be performed in the following sequence, ignition and explosion of MGG—gas generation and injection into movement tube—backward movement of piston—withdrawal of wire (in backward direction)—rotation of worm 14—rotation of worm wheel 15—rotation of spool 22 and winding of webbing 21—self-locking of worm wheel 15—reverse rotation of torsion bar (actuation of load limiter)—withdrawal of webbing 21. This operation may not be affected by the lock of an Emergency Locking Retractor (ELR) 24 and the residual gaseous pressure.

In this operation, the withdrawal of the webbing 21 by the load limiter may be performed by the reverse rotation of the torsion bar 23 while the spool 22 is being fixed.

The reference numeral 17 of FIG. 2 may denote a mechanical unit that interrupts power transmission between the spool and the pretensioner upon normal withdrawal or winding of the seat belt webbing but performs locking between the spool and the pretensioner upon or after actuation of the pretensioner in which instantaneous power transmission is performed. Since this mechanical unit is a mechanism that is already being applied in the related art, a detailed description thereof will be omitted herein.

On the other hand, the operation of typical pretensioner and load limiter is being performed in the following sequence, ignition and explosion of MGG—gas generation—movement of ball [piston]—rotation of pinion gear—rotation of spool and winding of webbing—(load increase by residual gaseous pressure)—ELR lock—backward movement of ball [piston]—reverse rotation of torsion bar (actuation of load limiter)—withdrawal of webbing (square brackets [ ] represent examples of the rack & pinion type)

In a pretensioner of a seat belt for a vehicle according to an exemplary embodiment of the present invention, a self-locking is performed by a worm drive (worm and worm wheel), thereby fixing a spool regardless of a residual gaseous pressure and thus preventing an instantaneous load reduction such as typical locking-dip.

Also, the pretensioner of the seat belt for the vehicle can prevent overshoot that is an abnormal load increase, and has various advantages such as reduction of performance deviation and improvement of passenger protection performance as a restraint apparatus.

Furthermore, since the pretensioner of the seat belt for the vehicle can achieve force transmission and action by the worm and the worm wheel, the pretensioner has advantages in operational reliability and performance deviation. Particularly, since the pretensioner is not affected by forces of other external factors, the overshoot and the locking-dip can be effectively prevented.

In addition, the performance tuning can be performed only with simple dimensional changes (changes of pitch, gear tooth ratio, and screw thread angle) of the worm and the worm wheel as a constraint apparatus, and since a large space is not needed, the pretensioner of the seat belt for the vehicle is free from the restraint of the package space.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pretensioner apparatus of a seat belt for a vehicle, comprising:
   a movement tube;
   a piston movably disposed inside the movement tube;
   a gas generator fluid-connected to the movement tube and generating a gas upon crash of the vehicle so as to inject the gas into the movement tube to move the piston in a predetermined direction;
   a linkage unit;
   a worm connected to the piston through the linkage unit; and
   a worm wheel engaged with the worm,
   wherein the worm rotates by movement of the piston via the linkage unit when the piston moves in the predetermined direction by the gas generated by the gas generator, and
   wherein the worm wheel fixed to a spool rotates together with the worm to rotate the spool and a seat belt webbing connected to the spool is wound around the spool while the worm rotates by the movement of the piston.

2. The pretensioner apparatus of claim 1, wherein the linkage unit includes a wire having:
   a first end connected to the piston; and
   a second end connected to a winding part formed on an end of the worm,
   wherein the second end of the wire is kept wound around the winding part when the crash of the vehicle does not occur, and
   wherein the second end of the wire rotates the worm while being unwound from the winding part upon the movement of the piston in the predetermined direction when the gas is injected into the movement tube.

3. The pretensioner apparatus of claim 1, wherein an end of the movement tube is sealed and the linkage unit slidably passes through the end of the movement tube.

4. The pretensioner apparatus of claim 3, wherein the linkage unit includes a wire having:

a first end connected to the piston through the end of the movement tube; and a second end connected to a winding part formed on an end of the worm, wherein the second end of the wire is kept wound around the winding part when the crash of the vehicle does not occur, and wherein the second end of the wire rotates the worm while being unwound from the winding part upon the movement of the piston in the predetermined direction when the gas is injected into the movement tube.

5. The pretensioner apparatus of claim 3, wherein the gas generator is connected to a portion of the movement tube between the end of the movement tube and the piston.

6. The pretensioner apparatus of claim 1, wherein the piston is shaped of a ball.

7. The pretensioner apparatus of claim 1, wherein a torsion bar is connected to the spool.

\* \* \* \* \*